G. F. MORSE.
GRAPE AND ORANGE CLIPPER.
APPLICATION FILED NOV. 11, 1910.
1,010,784.
Patented Dec. 5, 1911.
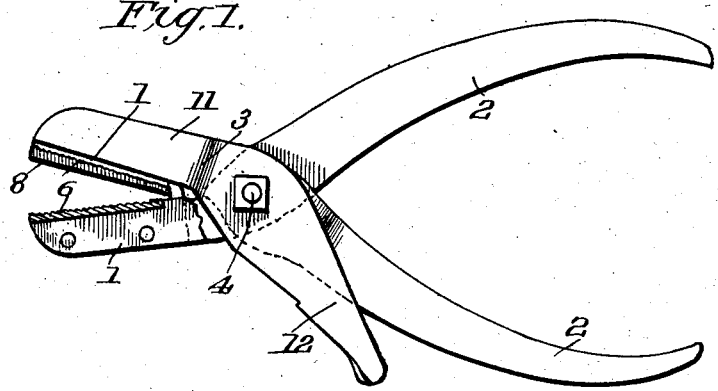
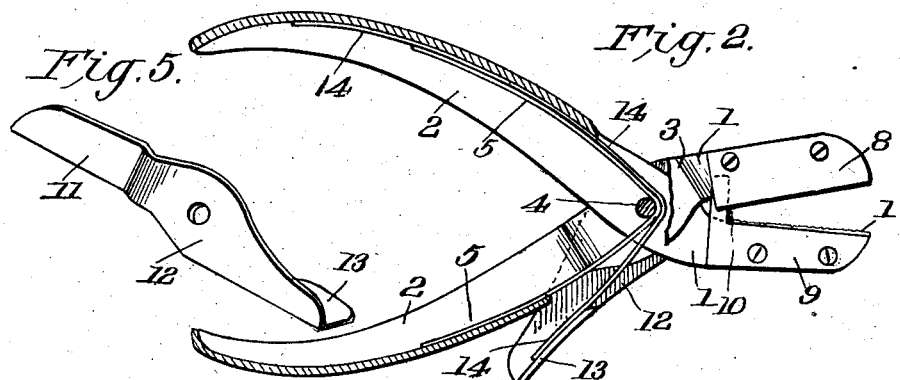
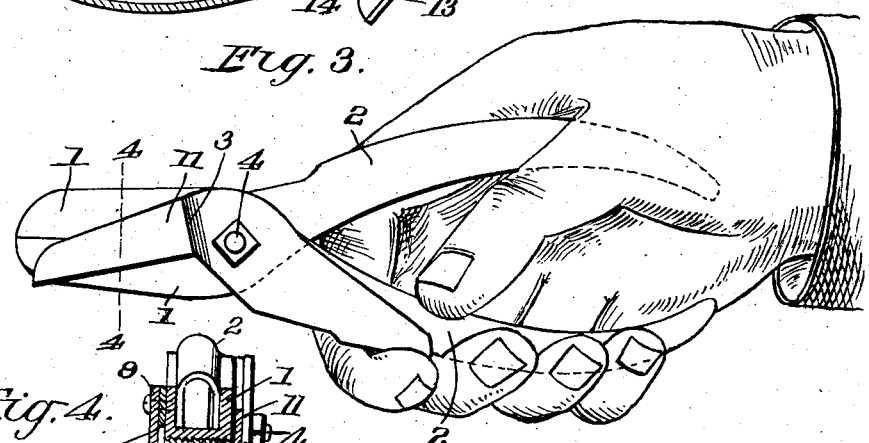
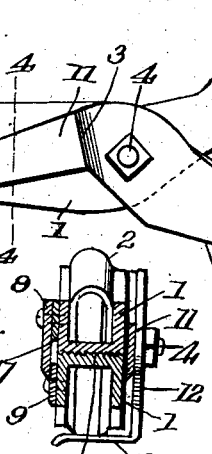
Inventor
George F. Morse

UNITED STATES PATENT OFFICE.

GEORGE F. MORSE, OF PERU, NEW YORK.

GRAPE AND ORANGE CLIPPER.

1,010,784. Specification of Letters Patent. Patented Dec. 5, 1911.

Application filed November 11, 1910. Serial No. 591,900.

*To all whom it may concern:*

Be it known that I, GEORGE F. MORSE, citizen of the United States, residing at Peru, in the county of Clinton and State of New York, have invented certain new and useful Improvements in Grape and Orange Clippers, of which the following is a specification.

This invention comprehends certain new and useful improvements in tools or appliances for use in cutting grapes, oranges, or other fruit, and the invention has for its primary object a simple durable and efficient construction of device of this character by the use of which the operator may clip the grape or orange stem from the vine or tree and deposit the bunch of grapes, orange or other fruit in the basket or other receptacle without touching the fruit directly with his hands.

The invention also has for an object a simple device of this character which embodies an orange stem clipping device, whereby the operator may first cut the orange from the tree by the use of the tool and carry it suspended by the cut-off stem to the receptacle and deposit it in the latter, and, without releasing the grip of the tool from the stem, clip off from the fruit the short cut-off portion of the stem by the use of the stem clipping blade without the necessity of at all handling fruit directly with the hand, in contra-distinction to the practice heretofore ordinarily in vogue, in which the operator has been accustomed to use both hands, one to clip off the short stem and the other to hold the basket under the stem to catch the orange when it dropped. And the invention has for a still further object an improved clipping or cutting tool which will enable the operator to pick a larger quantity of fruit than has heretofore been possible, and with the additional advantage that the fruit will be handled more carefully than heretofore.

With these and other objects in view as will more fully appear as the description proceeds the invention consists in certain constructions, arrangements and combinations of the parts that I shall hereinafter fully describe and claim.

For a full understanding of the invention reference is to be had to the following description and accompanying drawing, in which—

Figure 1, the side elevation of the tool constructed in accordance with my invention; Fig. 2, is an opposite side view thereof, parts being broken away and in section; Fig. 3, is a view illustrating the operation of the stem clipping knife for oranges; Fig. 4, is a transverse sectional view on the line 4—4 of Fig. 3. Fig. 5 is a detail perspective view of the clipping knife and its operating lever.

Corresponding and like parts are referred to in the following description and indicated in all the views of the drawing by the same reference characters.

My improved fruit cutting and clipping tool embodies preferably metallic jaws 1, and handles 2, the jaws and handles being preferably formed integral and of channel metal, in order to secure lightness with strength. The jaws and handles cross, as shown being provided with slots intermediate of their ends for this purpose, and the over-lapping sides of one of these members are outwardly off set as indicated at 3 so as to properly over-lap the adjoining part, the parts being secured together by a pivot stud 4 of any desired character. The two members which form the respective jaws and handles, are pressed upon a spring 5 which extends around the pivot stud 4, the ends of the spring extending into the channeled handles 2 so as to normally hold the jaws and handles in open position. Preferably, the inner or opposing faces of the jaws 1 are roughened or serrated as indicated at 6 in order to properly grip the stem that is to be cut and to otherwise prevent the stem and the fruit suspended therefrom, from slipping out of the tool and dropping to the ground as it is moved to and deposited within the usual receptacle.

A fillet strip 7 is secured to one jaw 1, and the blade 8 is also secured to said jaw over the fillet strip, the inner or cutting edge of said blade projecting beyond the inner roughened face of said jaw. A blade 9 is connected to the other jaw, the cutting edge of this last named blade being preferably set back from the roughened face of the jaw to which said blade is attached, whereby the two jaws, as they are brought together, will properly clip the stem and hold the stem before the cut has been made. The blade 9 is preferably provided with a laterally projecting tongue 10, see Fig. 2, which is adapted to move in the space formed by the fillet strip 7 between the heel of the blade 8 and the adjoining face of the jaw, so as to serve as a guiding device and at the same time prevent the same from being caught and pinched in the clutch of the jaws as the latter are brought together.

In addition to the above named parts, my improved instrument comprises a stem clipping knife 11 which is primarily designed for use in culling oranges. This knife 11 is formed integral with the lever 12 which is pivotally mounted on the stud 4 and which is adapted to sweep across one side of the jaws 1 when the latter are closed. The lever 12 for the knife 11 is formed at its rear end with a laterally projecting extension 13 designed to form a finger or thumb piece, and the spring 14 is engaged around the pivot stud 4, one end of said spring appearing against the extension 13 in a direction to press the lever 12 away from the adjoining handle 2 while the opposite end of the spring 14 lies within the other handle, as clearly illustrated in the drawing.

From the foregoing description in connection with the accompanying drawing the operation of my improved fruit cutting device will be apparent. In the practical use of the device, in, for instance, the operation of cutting bunches of grapes from the vine, the jaws 1, are applied to the stem at the proper point and the handles 2 pressed together so as to close the jaws, the inner or opposing faces of the jaws gripping the stem before the blades 8 and 9 shall have been brought close enough together to sever the stem, and the continued closing movement of the jaws serving to sever the stem by the blades 8 and 9, at which point, the device still being held closed, the bunch of grapes may be carried to or deposited in a basket or other receptacle without the necessity of the operator touching the fruit at all with his hand. In the operation of cutting oranges from the tree, the same manipulation of the tool will be proceeded with so far as the cutting operation itself is concerned and after the fruit has been deposited within the basket, it will only be necessary for the operator to press his finger upon the extension 13 of the lever 12, which will cause the knife 11 to sweep across the closed jaws and clip off from the orange the small portion of the stem that remained thereon when the orange was cut from the tree. It will be particularly noted that this last named operation can also be performed in a rapid and efficient manner without the necessity of the operator directly handling the fruit, that is, directly touching the same with his hand in any stage of the operation.

Having thus described the invention what is claimed as new is;

1. A fruit picker comprising clamping jaws, coöperating blades carried at one side of the jaws and meeting in offset relation thereto, and a clipping knife carried at the opposite side of the jaws for independent operation.

2. A fruit picking implement including pivoted jaws, cutting blades carried at one side of the jaws and meeting below the upper face of the lower jaw, and a clipping knife hinged concentric to the jaws for coöperation against the adjacent sides thereof.

3. A fruit picking implement including gripping jaws for engagement with a stem, coöperating blades carried in offset relation against one side of the gripping jaws to cut the stem subsequent to the gripping of the same, and a clipping knife carried at the opposite sides of the jaws for cutting the stem independently of the action of the gripping jaws.

4. A fruit picking implement including hinged jaws, coöperating cutting blades carried at one side of the jaws for movement therewith and having their edges meeting in offset relation to the jaws to effect an offset cutting action to the meeting of the jaws, and a clipping knife mounted for movement against the opposite sides of the jaws for subsequent operation to the closing of the jaws.

5. A fruit picking implement including pivoted jaws for gripping a stem, a pivot pin connecting the jaws, a spring carried about the pivot pin and having its ends resting against the handle portions of the jaws for spreading the jaws, coöperating blades rigid against one side of the jaws for movement therewith and having their edges meeting in offset relation to the jaws, a clipping knife hinged upon the pivot pin and movable against the adjacent sides of the jaws at the opposite side of the implement, and a spring carried about the pivot pin and engaging against the inner end of the clipping knife and the opposite handle portion to normally raise the clipping knife.

In testimony whereof, I affix my signature in presence of two witnesses.

GEORGE F. MORSE. [L. S.]

Witnesses:
　HARRY E. LEGERE,
　ALBERT CHESWORTH.